United States Patent [19]

Daniels, Jr.

[11] Patent Number: 4,814,995
[45] Date of Patent: Mar. 21, 1989

[54] POSTAGE VALUE DETERMINING SCALE WITH RECALL AND DISPLAY OF SPECIAL FEE ENTRIES

[75] Inventor: Edward P. Daniels, Jr., Bridgeport, Conn.

[73] Assignee: Pitney Bowes Inc., Stamford, Conn.

[21] Appl. No.: 363,179

[22] Filed: Mar. 29, 1982

[51] Int. Cl.⁴ .............................................. G06F 15/20
[52] U.S. Cl. ................ 364/464.02; 364/900; 177/25.13
[58] Field of Search ............... 364/464, 466, 567, 568, 364/571, 200 MS File, 900 MS File, 464.02, 464.03; 179/3, 4, 5, 7, 25

[56] References Cited

U.S. PATENT DOCUMENTS

4,326,254 4/1982 Uchimura ........................ 364/567

Primary Examiner—Gary V. Harcom
Assistant Examiner—Dale M. Shaw
Attorney, Agent, or Firm—Peter Vrahotes; Melvin J. Scolnick; David E. Pitchenik

[57] ABSTRACT

A postage value determining scale includes a system processor, a weighing device which generates weight indicative signals, a display and a keyboard for operator entry of information relating to the determination of postage and one or more memories which store postage data. The keyboard includes a plurality of nonilluminated multifunction keys with specific keys being assigned for the entry of special services such as certified mail, c.o.d., special delivery and the like. Upon detecting a keyboard entry assigned for such purpose, the processor recalls and sequentially displays indicia of special services previously selected by the operator and optionally the fee amount of each selected service. After displaying indicia of all the special services selected, the processor thereafter re-enters the previously displayed indicia in the display.

8 Claims, 5 Drawing Sheets

POSTAGE VALUE DETERMINING SCALE WITH RECALL AND DISPLAY OF SPECIAL FEE ENTRIES

BACKGROUND OF THE INVENTION

1. Field of the Invention

This invention relates generally to postage value calculators and more particularly to a system and method for avoiding incorrect postage calculations when mailing articles with special postal services.

2. Related Applications

In a copending patent application of Edward P. Daniels et al entitled Method and System for Computing Special Fees in a Parcel Postage Metering System, Ser. No. 153,652 now U.S. Pat. No. 4,325,440 filed May 27, 1980 and assigned to the assignee of the present invention, a mailing system having a postage value determining system processor was disclosed. The mailing system included a keyboard for operator value determination and means for calculating a postage value for an article in accordance with a schedule of charges based upon article weight, destination and class of transportation. In addition, the keyboard included a plurality of keys, each of which was assigned a specific special service entry function in conjunction with a postage calculation for mailing an article. When special services such as c.o.d., registered or insured, were desired, the operator pressed the associated special service key. An internal key lamp was illuminated upon depression of the selected key and the key remained illuminated until completion of the article mailing cycle. Each illuminated special service key provided a constant optical signal indicating that the total postage value calculated included an amount for the special service fee associated with such key.

The apparatus determined the fee value associated with each selected special service, whether the selected special service was suitable for use with the selected class of service and whether multiple selected special services were compatible with each other.

Among the disadvantages of the mailing system described in the copending application was the keyboard design which required numerous keys for the purpose of special service entires and illumination indicators for such keys. Further, the illuminated keys distracted the operator's attention from the display which indicated article weight, service class and postage amount.

SUMMARY OF THE INVENTION

A nonilluminated keyboard associated with a postage value determining system processor includes a plurality of keys for the entry of postal information requisite for the calculation of a postage value for an article to be mailed. The processor is adapted to calculate a total postage value requisite for mailing an article with the calculated value including destination charges determined by weight, class of transportation and distance as well as special services.

Pursuant to the invention, a keyboard signal detected by the processor will cause the processor to enter into a special fee recall/display subroutine. The processor thereafter removes and stores the data indicia appearing in the display and sequentially indicates in the display the special services which have been selected in conjunction with the article to be mailed. Optionally, the monetary amount or increment of the total postage calculated which has been attributed to each special service selected is indicated at a separate section of the display.

After displaying indicia indicative of all of the special services selected, the processor re-enters the prior indicia and the operator may proceed to change the postage value calculation to add additional special service fees or clear undesired special service fees.

The system processor is preferably housed within a stand alone electronic parcel scale which includes a weigh device for providing weight indicative signals, the keyboard, the display, suitable memories for storing postage data and optional interface boards for communicating with optional peripheral mailing system devices.

From the foregoing compendium, it will be appreciated that it is an object o the present invention to provide a postage value determining system of the general character described which is not subject to the disadvantages aforementioned.

A further aspect of the present invention is to provide a postage value determining system which includes a low cost multifunction keyboard for operator entry of information relating to postage determination.

A further feature of the present invention is to provide a postage value determining system of the general character described which provides a visual display indicative of special service entries without employing illuminated keys for such purpose.

Other features in part will be obvious and in part will be pointed out hereafter.

With these ends in view, the invention finds embodiment in certain combinations of elements, arrangements of parts and series of steps by which the said features and certain other features are hereinafter attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 2:
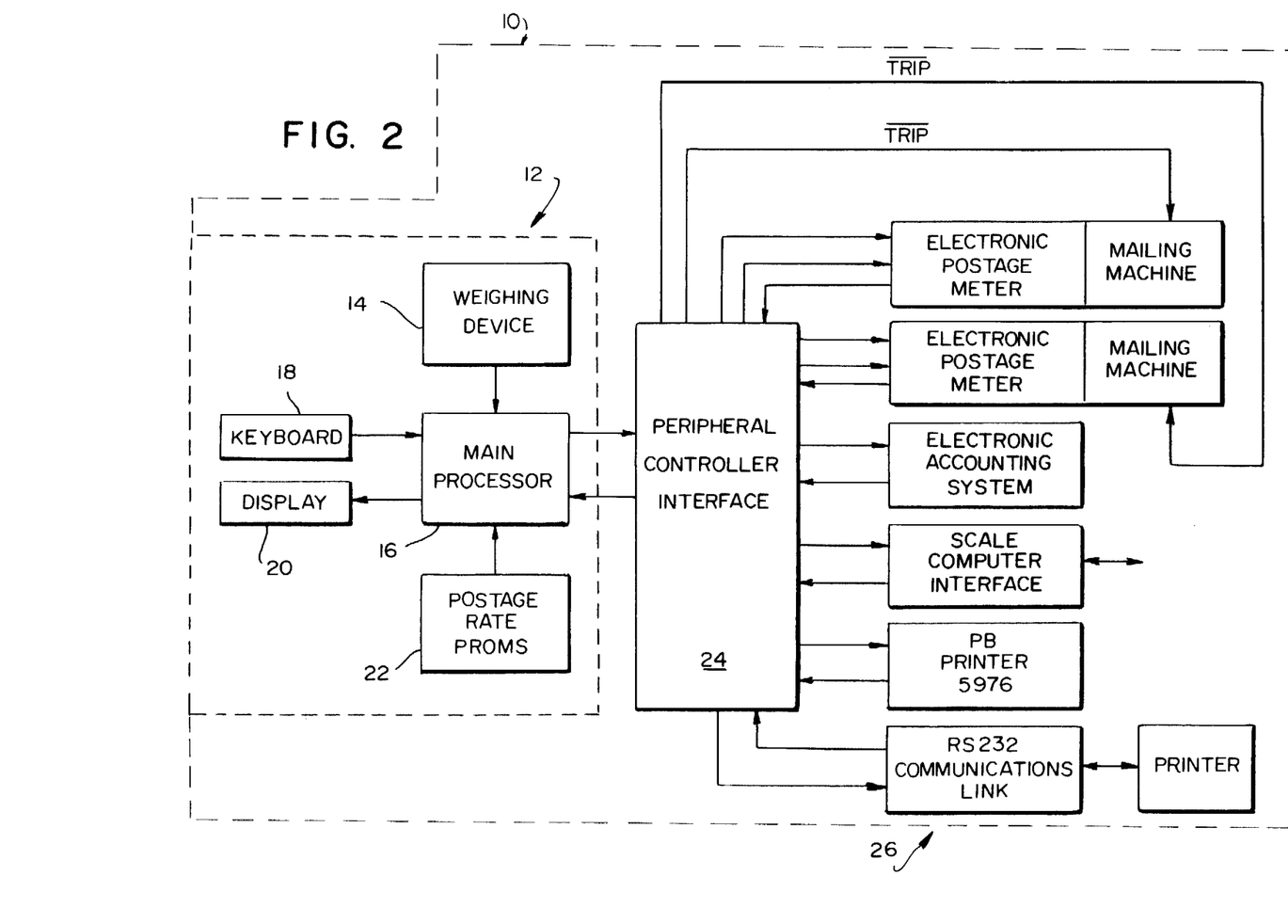
FIG. 2 is a schematized block diagram illustrating an automated mailing system which includes the postage value determining scale and a plurality of optional mailing system peripheral devices.

Referring now in detail to the drawings, the reference numeral 10 denotes generally an automated mailing system (depicted in FIG. 2). The system 10 includes a processor controlled stand alone postage scale 12 which is adapted to calculate the postage or other transportation charges requifed to transport an article or parcel. In most instances, transportation charges are based upon the article weight, class of transportation, and with respect to certain classes, distance to destination (zone). In addition, transportation charges are also based upon any desired special postal services such as certified mail, registered mail, special delivery, etc.

The scale 12 includes a weighing device 14 interconnected to a load cell 15. The load cell 15 is in turn interconnected to a main system processor 16 through an analog circuit board 17, all in a manner well known to those skilled in the art. The system processor 16 is programmed to calculate the requisite postage or other transportation charges for the article or parcel placed upon a platform 19 of the weighing device 14.

The data necessary for determination of article postage, e.g. destination operands, class of transportation operands, special postal services desired, etc., are entered at a keyboard 18. Weight, keyboard and calculated information are indicated at a display 20.

With the weight, class of transportation, destination zone and special postal services operands entered, the system processor 16 determines the requisite postage by reference to a postage rate PROM 22 and provides a signal to the display 20 for indicating the calculated postage amount.

The scale 12 is constructed as a stand alone unit for use without peripheral devices associated with a complete mailing system 10. It maintains versatility for controlling, transmitting data to and receiving data from various peripheral devices if a complete mailing system is desired by the user. As described in a copending related application of Daniel F. Dlugos, et al, entitled Postage Scale Peripheral Interface, Ser. No. 235,241, now U.S. Pat. No. 4,410,961 filed Feb. 17, 1981, assigned to the assignee of the present invention, and incorporated herein by reference, a peripheral controller interface 24 is provided as part of a separate circuit board.

The interface 24 is adapted to establish communications links between the system processor 16 and various mailing system peripheral devices which are generally denoted by the reference numeral 26. Typical peripheral devices may include separate electronic postage meters for United States Postal Service postage denominations and United Parcel Service fee denominations, an electronic accounting system, a scale computer interface, a Pitney Bowes Model 5976 printer, and an RS 232 communications link which in turn can interface with one of several available RS 232 printers or any other desirable peripheral device which communicates in ASCII code.

Figure 3:
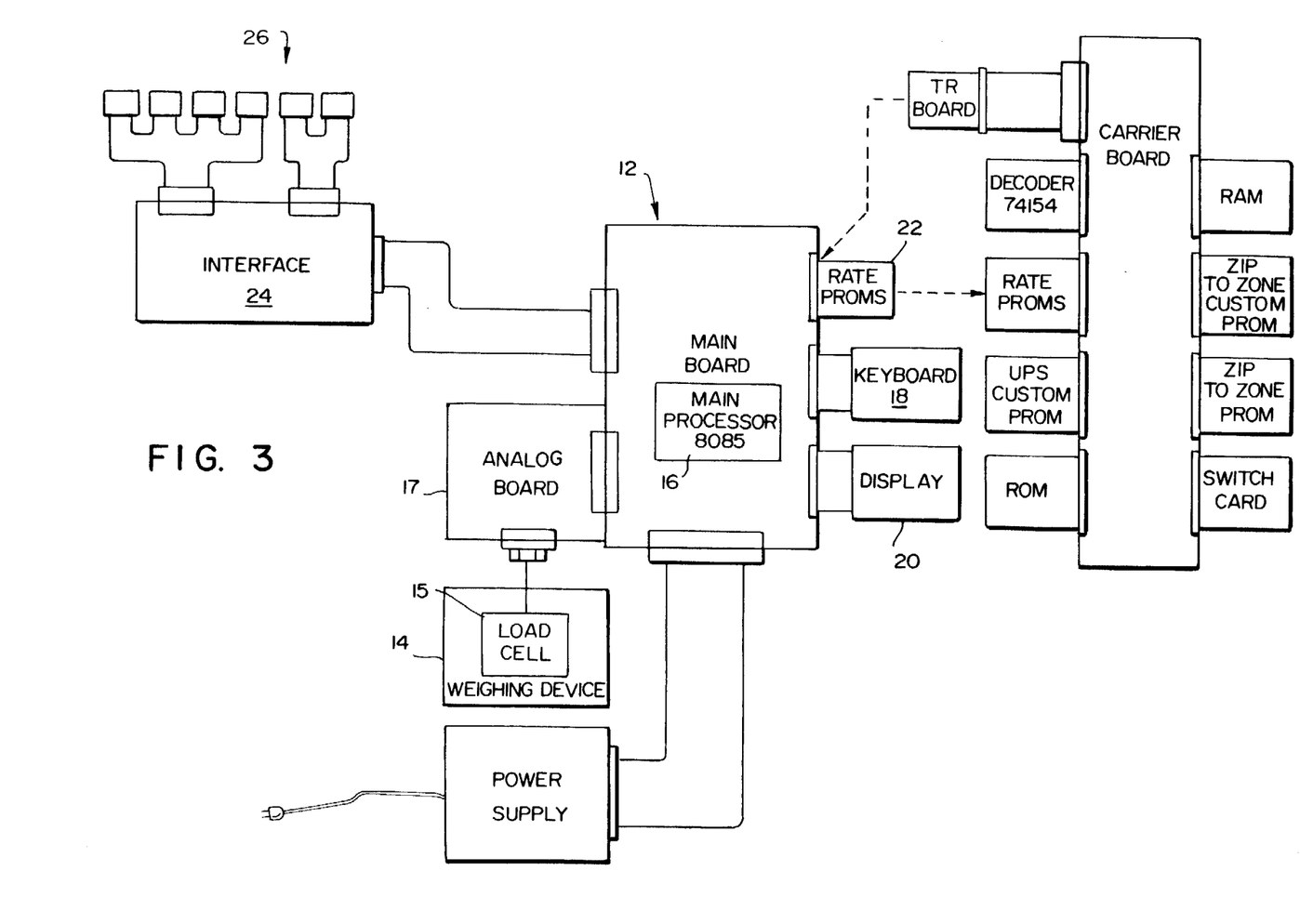
FIG. 3 is a further schematized block diagram illustrating the postage value determining scale.

With reference now to FIG. 3, the postage rate PROM card 22 may be mounted to a memory port socket of a circuit board which carries the main processor 16. In accordance with the disclosure of a further copending related application of Daniel F. Dlugos, et al, entitled Postage Value Determining Scale with Expandable Memory Port, Ser. No. 277,779 now U.S. Pat. No. 4,430,716, filed June 26, 1981, and assigned to the assignee of the present invention, the processor 16 is programmed for optional postage value related functions such as zip code to destination zone conversion. If such optional features are desired, in lieu of connecting the PROM card 22 directly to the memory port, a transition board is provided for connecting the main board to a ribbon cable assembly. The ribbon cable is connected, at its opposite end, to a carrier board having a plurality of sockets and a cage for mounting several memory cards including the rate PROM card 22. The substitution of the PROM card 22 by the transition board and carrier board is depicted in dashed arrows on FIG. 3.

In a manner similar to that described in the related copending application Ser. No. 153,652 now U.S. Pat. No. 4,325,440, the processor 16 selects postal information indicative of the carrier type, class and destination of an article to be mailed, obtains weight information for the article, selects special service information indicative of at least one of a plurality of special service fee categories for use with the article and generates a postage value for the article from the postal information, the weight information and the special fee information.

It should be noted, at this juncture, that the term "postage" is to be interpreted in its broadest sense in conjunction with this invention to include calculatable rates used not only by governmental postal authorities such as the U.S. Postal Service but, in addition, rates used by private shipping entities such as United Parcel Service.

The system processor 16 may comprise any suitable microprocessor such as an Intel 8085 processor available from Intel Corporation of Santa Clara, Calif. The basic mode of operation of the scale 12 is well known to those of skilled in the art and typically illustrated in U.S. Pat. No. 4,135,662 entitled Operator Prompting System issued Jan. 23, 1979 to Daniel F. Dlugos and assigned to the assignee of the present invention.

Figure 1:
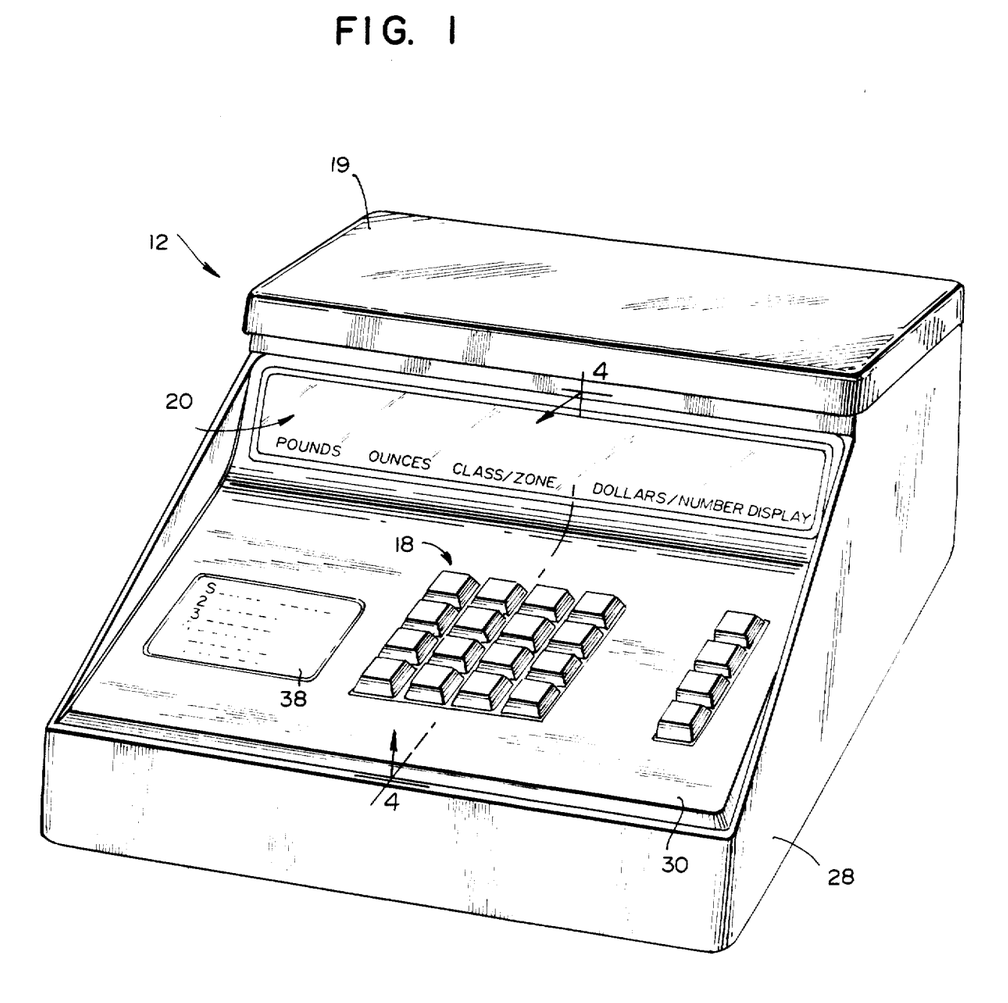
FIG. 1 is a perspective illustration of a postage value determining scale constructed in accordance with and embodying the present invention.
Figure 4:
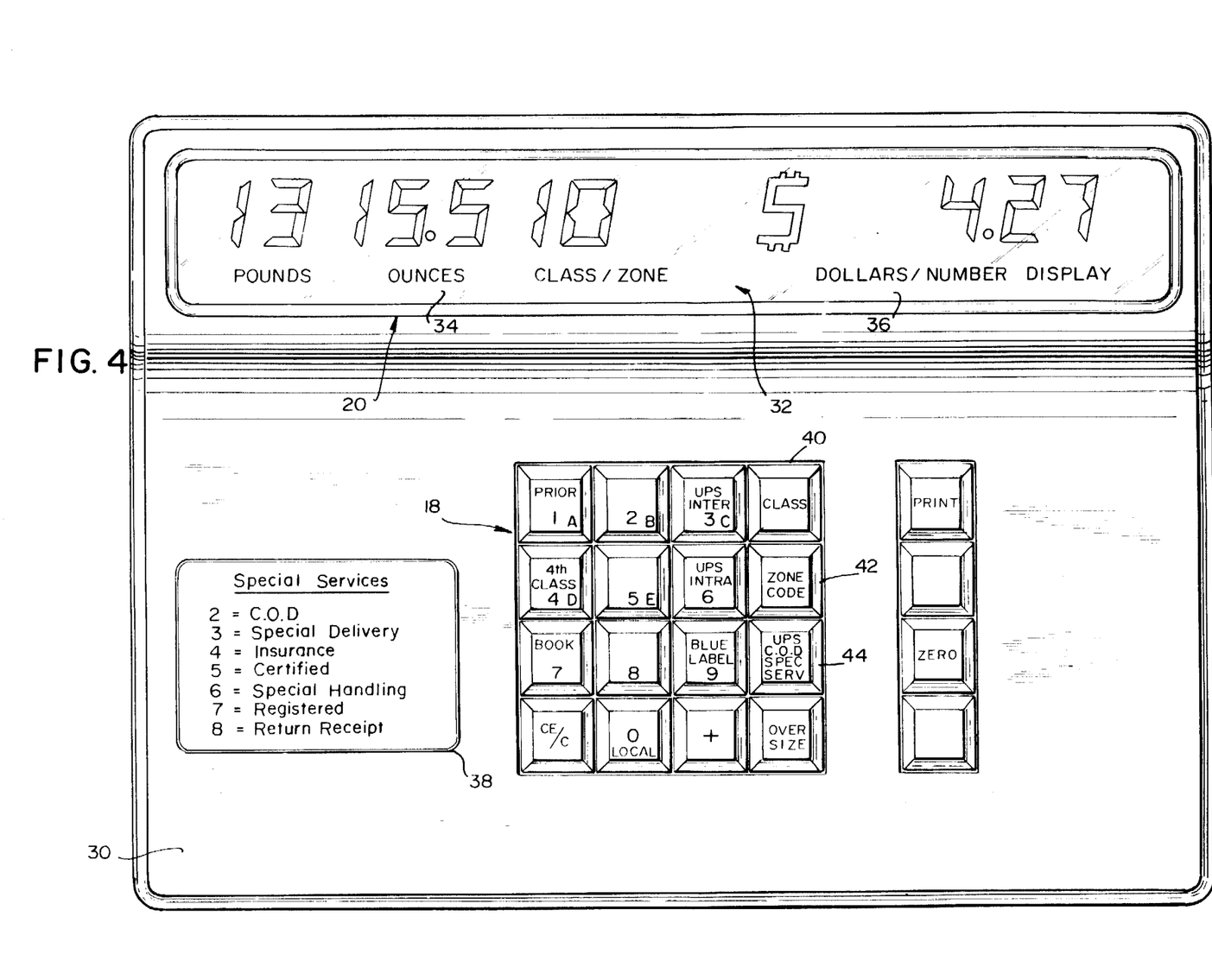
FIG. 4 is an enlarged size auxiliary view of the scale panel including a display and a keyboard, the same being taken substantially along the plane 4—4 of FIG. 1.

Referring now to FIGS. 1 and 4, the scale 12 includes an outer cabinet 28 with the weighing device platform 19 mounted at a substantially horizontal orientation along the rear upper surface thereof. A keyboard-display panel 30 is mounted within a cabinet aperture in the upper forward surface of the cabinet 28.

The keyboard-display panel 30 includes suitable apertures through which the individual keys of the keyboard 18 project. A window 32 is provided for viewing the display 20. The window 32 includes suitable printed designations to assist the operator in interpreting the numerals and symbols appearing in the display.

The display 20 is itself divided into a nine character segment 34 wherein numeric indicia indicative of article weight, transportation class and destination zone appear and a six character segment 36 wherein numeric keyboard entries first appear and wherein the calculated postage value is displayed.

As previously mentioned, the keyboard 18 includes a plurality of multifunction nonilluminated keys which may be employed for entering desired special services. The panel 30 may include a suitable lable 38 wherein a listing of special services available and their corresponding numeric keys is imprinted.

Some typical special services available and indicated on the label 38 include C.O.D. mailing, the fee for which may be included in a calculated postage value through the numeral 2 key, SPECIAL DELIVERY services which may be entered through the numeral 3 key, INSURANCE which may be entered through the numeral 4 key, CERTIFIED MAIL which is entered through the numeral 5 key, SPECIAL HANDLING entered through the numeral 6 key, REGISTERED mail entered through the numeral 7 key and RETURN RECEIPT entered through the numeral 8 key. It should be appreciated that the foregoing listing is merely exemplary of presently available special services.

After a parcel is placed on the platform 19, the article weight appears in the display segment 34 above the appropriate designations. To thereafter enter the rate or class of transportation, the operator depresses the appropriate multifunction numeral key for the desired class, e.g. the numeral 1 key for PRIORITY MAIL. In the display segment 36, above the "NUMBER DISPLAY" designation, the numeral 1 will then appear. To complete entry of such class for postage calculation, the user thereafter depresses a CLASS ENTRY key 40 whereupon the numeral 1 will appear above the "CLASS" designation of the display segment 34.

If the postage calculation is dependent upon a destination zone, a zone prompt message will next appear in the display segment 36. The operator may then enter the destination zone by depressing an appropriate numeral key followed by depression of a ZONE ENTRY function key 42. The designated zone number will then appear in the display segment 34 above the ZONE designation. After entry of the weight, class and zone data, the processor determines the appropriate postage for mailing the article and enters such postage value in the display segment 36 as illustrated in FIG. 4.

If special services are desired in conjunction with mailing such article, the operator thereafter depresses the numeral key assigned for a selected special service such as the numeral 3 key for SPECIAL DELIVERY. Such keyboard entry is thereafter followed by depression of a SPECIAL SERVICE entry key 44 whereupon the postage value appearing in the display will comprise the total calculated postage value which includes the appropriate amount for special delivery mail. In operation, upon entry of a special service, the processor determines the appropriate special fee value, stores such value in a RAM and stores the total calculated value in the RAM.

Assuming the article is to be mailed with additional special services such as REGISTERED and RETURN RECEIPT, the operator would thereafter depress the numeral 7 key followed sequentially by depression of the SPECIAL SERVICE entry key 44 and the numeral 8 key followed by depression of the SPECIAL SERVICE entry key 44. The total postage value appearing in the display segment 36 will then be the total postage which include appropriate fees for special delivery, registered and return receipt. In addition, the calculated value of each special fee is separately stored in the RAM.

Before proceeding with actuation of mailing system peripheral devices for dispensing the calculated postage value, the operator may, in accordance with the present invention, verify the entry of the selected special services and confirm the fee value of each service. To effect such recall and display, the operator merely depresses the special service entry key 44 without a prior numeral key depression.

Figure 5A:
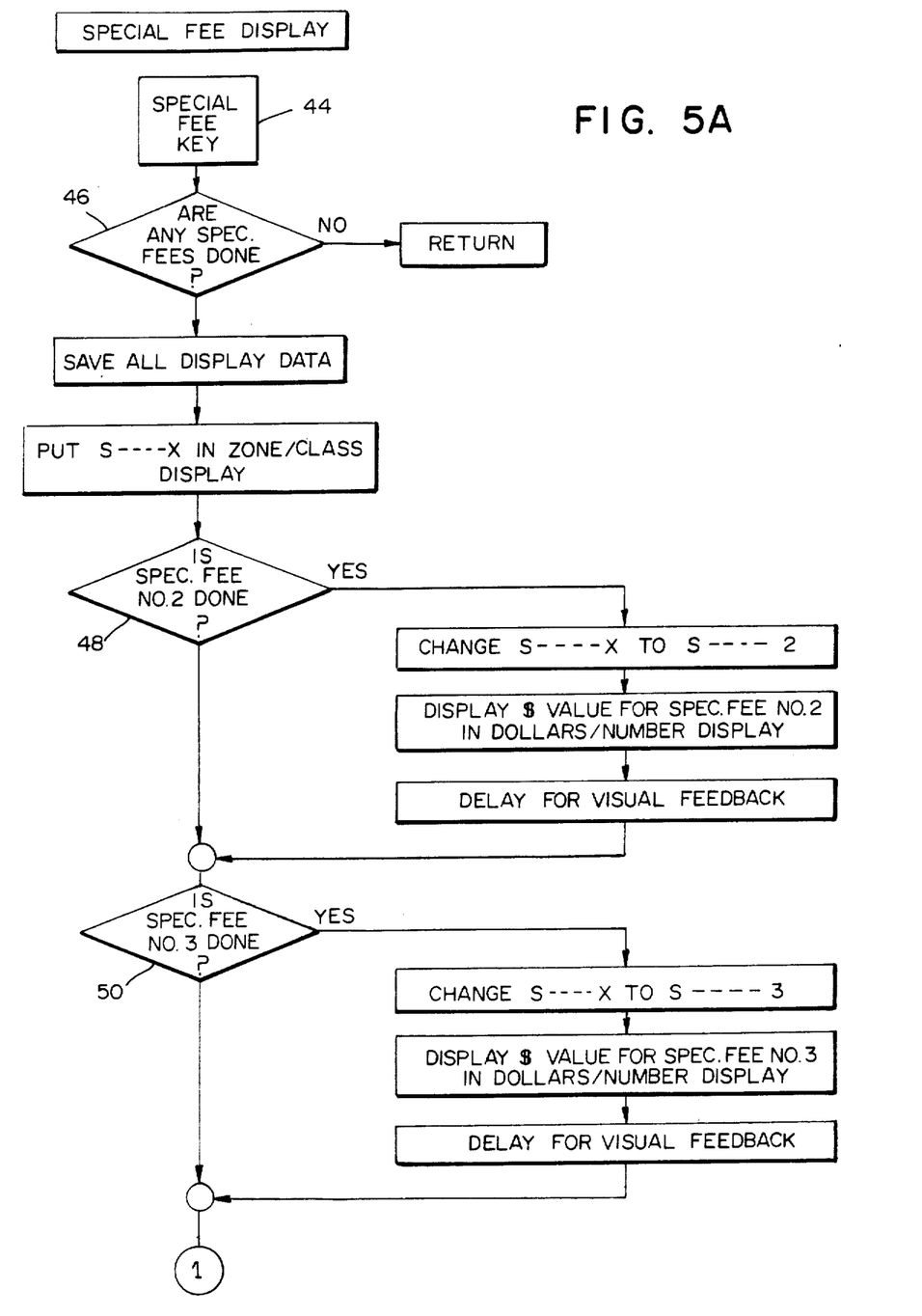
FIGS. 5a, 5b and 5c comprise a composite flow chart indicating a special fee display subroutine of a system processor of the postage value determining scale.
Figure 5B:
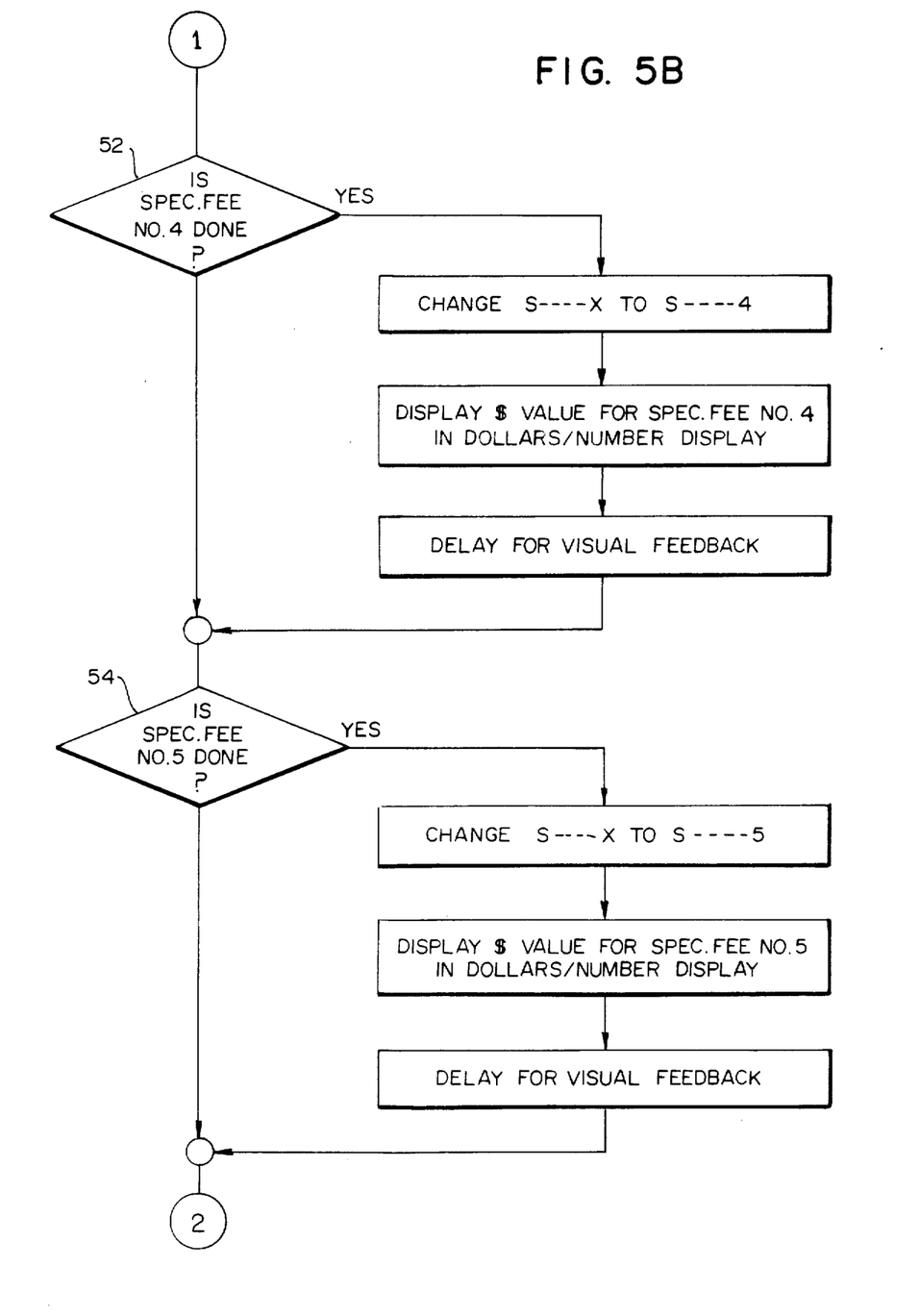
Figure 5C:
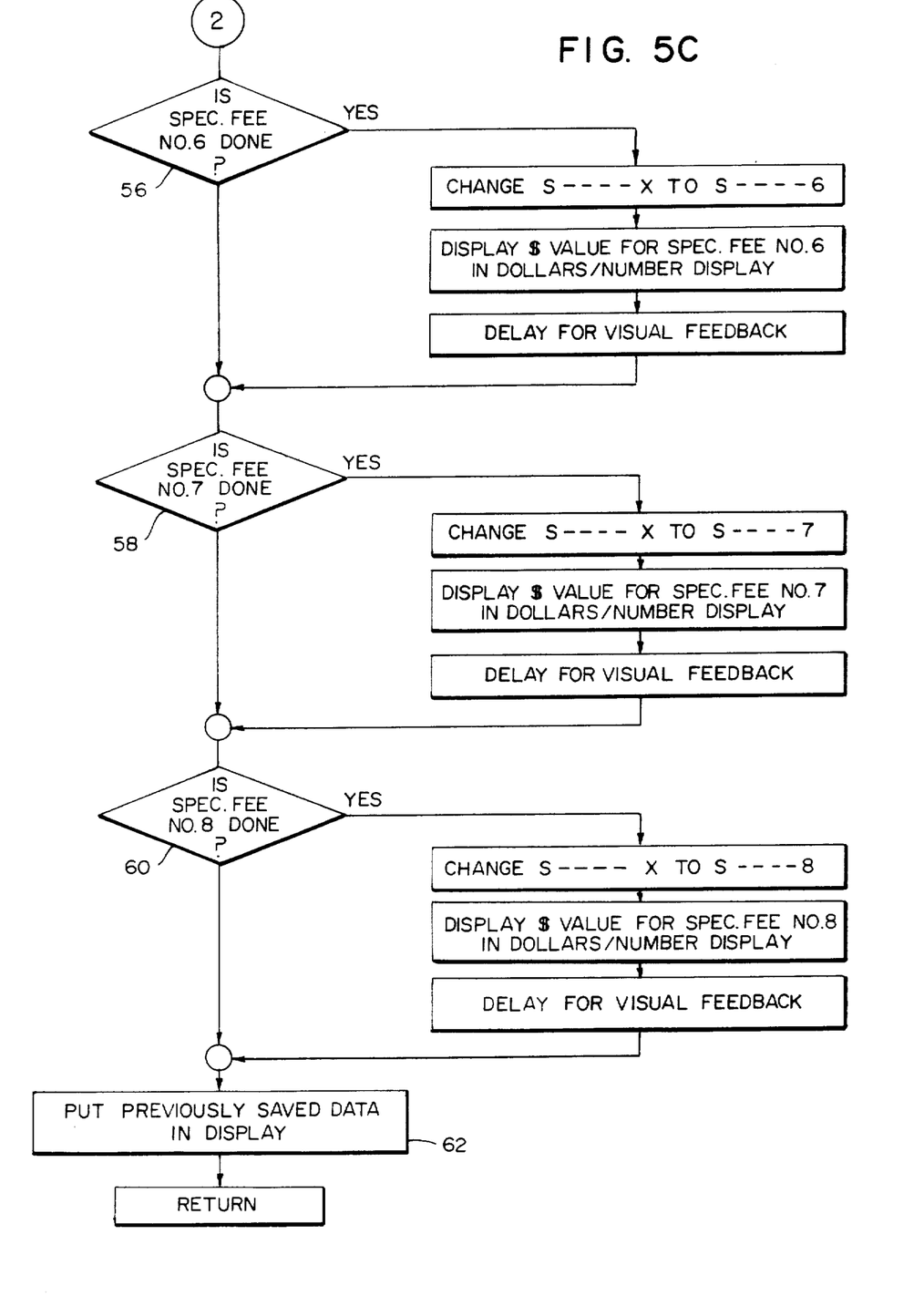

Upon detecting such keyboard entry, the system processor 16 enters into a special service fee recall and display subroutine, a flow diagram of which is depicted in FIGS. 5a, 5b and 5c. Referring now to such figures, the processor 16 first determines whether any special service fees have been entered as indicated at a decision block 46. If no special fees have been entered, the program returns. If any special service fees have been entered in conjunction with the postage value displayed, the program initially saves all display data and then enters S - - - X in the ZONE/CLASS portion of the display segment 34.

The program then determines whether the special service associated with numeral 2 key, i.e. C.O.D., has been entered as indicated at a further decision block 48. If C.O.D. special service has been entered, the display S - - - X is changed to S - - - 2 which corresponds to the numeral designation for C.O.D. as indicated in the label 38. The program thereafter recalls the dollar value increment attributable to such special fee from the RAM and indicates such value in the display segment 36. After a delay for visual perception by the operator, e.g. two seconds, a further determination is then made as to whether or not the special service associated with numeral 3 key, i.e. SPECIAL DELIVERY, has been entered as indicated at a decision block 50. If such special fee has been entered, the program changes the indicia appearing in the display segment 34 to indicate S - - - 3 and indicates, in the display segment 36, the dollar value for the selected special service fee which has been recalled from the RAM. After a delay for operator perception (visual feedback), the program then proceeds with a determination as to whether or not the special service associated with the numeral 4 key, i.e. INSURANCE, has been selected as indicated at a decision block 52. If such special service has been entered by the operator, the program thereafter changes the indicia in the display segment 34 to indicate S - - - 4 and the dollar value for such special fee is recalled from the RAM and indicated in the display segment 36.

After a delay for visual feedback, the program then sequentially renders similar determinations in conjunction with the remaining available special services associated with the numeral 5 key, i.e. CERTIFIED MAIL, the numeral 6 key, i.e. SPECIAL HANDLING, the numeral 7 key, i.e. REGISTERED MAIL, and the numeral 8 key, i.e. RETURN RECEIPT, as indicated in the decision blocks 54, 46, 58 and 60 respectively. As shown in FIGS. 5a, 5b and 5c, in the event any of the special services have been entered by the operator, the program displays the appropriate indicia with the letter symbol "S: followed by the numeral associated with such special service and further displays the dollar fee value of such selected special device.

In the event a particular special service has not been entered by the operator, the program proceeds to a determination regarding the next sequential special service. Upon completion of the sequential display of each special service indicia and their associated dollar values, the program thereafter returns the previously saved display data to the display as indicated to a block 62 and thereafter returns to the main program.

It should be appreciated that the subroutine need not display the dollar fee value attributable to each of the selected special services and may only provide a visual indication of the entered special services. For example, the display need only scroll the various special fee numbers preceded by the letter S which indicates that such number is a special service denotation.

Appended hereto as an exhibit is a complete program listing of a typical special service fee routine including the recall and display of entered special service indicia excluding, however, the recall and display of the dollar value attributables to each special service.

As various changes might be made in the postage value calculating system as set forth herein, it is to be understood that all matter herein described or shown in the accompanying drawings is to be interpreted as illustrative and not in a limiting sense.

Thus, it will be seen that there is provided a postage value determining scale with recall and display of special fee entries which achieves the various objects of the invention and which is well suited to meet the conditions of practical use.

Appendix

```
3389                      ;SF EQUATES FOR SUBROUTINE CALLS
3390   0003               UPDATE   EQU   0003H
3391   0008               SWAP     EQU   0008H
3392   0010               RDPROM   EQU   0010H
3393   0018               ADINDE   EQU   0018H
3394   001B               SWAP2    EQU   001BH
3395   0020               UNPCK    EQU   0020H
3396   0028               ENTDIG   EQU   0028H
3397   0030               CLRCL    EQU   0030H
3398                      ;RAM EQUATES FOR SF
3399   F848               DP       EQU   0F848H
3400   F80E               E0       EQU   0F80EH
3401   F80F               ECTR     EQU   0F80FH
3402   F809               DOL0     EQU   0F809H
3403   F83B               RS21     EQU   0F83BH
3404   F83A               RS11     EQU   0F83AH
3405   F82E               STRTC2   EQU   0F82EH
3406   F855               STW1Z    EQU   0F855H
3407   F812               SW10LB   EQU   0F812H
3408   F879               SFADR2   EQU   0F879H
3409   F852               STW10B   EQU   0F852H
3410   F853               STP1LB   EQU   0F853H
3411   F814               SW10Z    EQU   0F814H
3412   F876               TOTC2    EQU   0F876H
3413   F86A               VTOFF1   EQU   0F86AH
3414                      ;SF CALCULATION
3415   A16C               SFTLC2   EQU   0A16CH
3416   A148               SFD3     EQU   0A148H
3417   A1F0               SFDIN0   EQU   0A1F0H
3418   A149               SFD2     EQU   0A149H
3419   A1FB               SCH0     EQU   0A1FBH
3420   A1F1               DH0      EQU   0A1F1H
3421   A1FD               SFTBD0   EQU   0A1FDH
3422   A1F8               SFBMAD   EQU   0A1F8H
3423   A174               SFN1D0   EQU   0A174H
3424   A1CF               SFDONE   EQU   0A1CFH
3425   A1E5               MH0      EQU   0A1E5H
3426   A1E6               CH0      EQU   0A1E6H
3427   A1AE               SFRM0    EQU   0A1AEH
3428   A1AF               SFM0     EQU   0A1AFH
3429   A1FA               VRH0     EQU   0A1FAH
3430   A1FB               IRH0     EQU   0A1FBH
3431   A14C               SFC2     EQU   0A14CH
3432   A1F6               TMPAD1   EQU   0A1F6H
3433   A14A               SFD1     EQU   0A14AH
3434   A1DD               SFFLG1   EQU   0A1DDH
3435   000E               D0B      EQU   0EH
3436   A1FC               ADSUB    EQU   0A1FCH
3438                      ;THIS SECTION OF CODE SETS THE SF PROGRAM UP FOR A REDU
3439   8DC9   3A DD A1    REDUE:   LDA   SFFLG1
3440   8DCC   F6 08                ORI   08H
3441   8DCE   32 DD A1             STA   SFFLG1   ;SET REDU FLAG
3442   8DD1   3A AF A1             LDA   SFM0
3443   8DD4   47                   MOV   B,A
3444   8DD5   3A CF A1             LDA   SFDONE   ;RESET ALL BAD FEES
3445   8DD8   A0                   ANA   B
3446   8DD9   47                   MOV   B,A
3447   8DDA   3A F0 A1             LDA   SFDIN0
3448   8DDD   32 CF A1             STA   SFDONE   ;PUT THE FIRST FEE DONE IN SF DONE LOCATION
3449   8DE0   78                   MOV   A,B
3450   8DE1   32 FD A1    REDUE2:  STA   SFTBD0   ;SET ALL OTHER FEES IN THE SF TO BE DON REGISTER
3451   8DE4   E5                   PUSH  H
3452   8DE5   21 2E F8             LXI   H,STRTC2
3453   8DE8   11 76 F8             LXI   D,TOTC2
3454   8DEB   CD 08 00             CALL  SWAP
3455   8DEE   E1                   POP   H
3456   8DEF   C9                   RET
3457   8DF0   3A F0 A1    REDUE1:  LDA   SFDIN0
3458   8DF3   47                   MOV   B,A
3459   8DF4   3A CF A1             LDA   SFDONE
3460   8DF7   A8                   XRA   B
3461   8DF8   47                   MOV   B,A
3462   8DF9   3A F0 A1             LDA   SFDIN0
3463   8DFC   32 CF A1             STA   SFDONE
3464   8DFF   78                   MOV   A,B
3465   8E00   C3 E1 8D             JMP   REDUE2
3467                      ;SF SUBROUTINES
3468   0040               SETDPS   EQU   00040H
3469   F817               ERRSF    EQU   0F817H
3470   8E03   0E 05       CMP:     MVI   C,05H
3471   8E05   1A          CMP1:    LDAX  D
3472   8E06   37                   STC
3473   8E07   3F                   CMC
3474   8E08   96                   SUB   M
3475   8E09   CA 0D 8E             JZ    CMP2
3476   8E0C   C9                   RET
3477   8E0D   13          CMP2:    INX   D
3478   8E0E   23                   INX   H
3479   8E0F   0D                   DCR   C
3480   8E10   C2 05 8E             JNZ   CMP1
3481   8E13   C9                   RET
```

```
3483  8E14                SFCAL:
3484  8E14  3A 0F F8              LDA    ECTR       ;SEE IF ANY DIGITS ENTERED
3485  8E17  E6 0F                 ANI    0FH
3486  8E19  CA D2 8E              JZ     DISFEE     ;RETURN IF NO DIGITS ENTERED
3487  8E1C  3A DD A1              LDA    SFFLG1
3488  8E1F  E6 80                 ANI    80H        ;SEE IF REDOING A DOLLAR VALUE KEY
3489  8E21  C2 B1 8E              JNZ    DOFES
3490  8E24  21 0F F8              LXI    H,ECTR
3491  8E27  7D                    MOV    A,L
3492  8E28  B7                    ORA    A
3493  8E29  96                    SUB    M
3494  8E2A  6F                    MOV    L,A
3495  8E2B  3A 0F F8              LDA    ECTR
3496  8E2E  3D                    DCR    A
3497  8E2F  32 0F F8              STA    ECTR
3498  8E32  7E                    MOV    A,M
3499  8E33  36 00                 MVI    M,0
3500  8E35  FE 01                 CPI    1          ;SEE IF NUMBER TOO SMALL
3501  8E37  CA 99 8E              JZ     TOLARG
3502  8E3A  FE 09                 CPI    9
3503  8E3C  CA 99 8E              JZ     TOLARG
3504  8E3F  47                    MOV    B,A
3505  8E40  3E 00                 MVI    A,0
3506  8E42  37                    STC
3507  8E43  17          ROTAT:    RAL
3508  8E44  05                    DCR    B
3509  8E45  C2 43 8E              JNZ    ROTAT
3510  8E48  32 FD A1              STA    SFTBD0
3511
3512  8E4B                SFCAL7:
3513  8E4B  CD 35 8F              CALL   GTRTFE
3514  8E4E  3A DD A1              LDA    SFFLG1
3515  8E51  E6 07                 ANI    07H        ;SEE IF FEE ALLOWED
3516  8E53  C2 8F 8E              JNZ    SFRT
3517  8E56  CD 85 8F              CALL   FEOKRT     ;SEE IF FEE OK WITH RATE
3518  8E59  CD 21 90              CALL   GTREST     ;CHECK OUT RESTRICTIONS
3519  8E5C  3A DD A1              LDA    SFFLG1
3520  8E5F  E6 07                 ANI    07H
3521  8E61  C2 8F 8E              JNZ    SFRT
3522  8E64  CD 57 91              CALL   GTSFM      ;GET SF MASK
3523  8E67                DOLFEE:
3524  8E67  CD 62 91              CALL   GTCHD      ;GET CHART HEADER
3525  8E6A  3A DD A1              LDA    SFFLG1
3526  8E6D  E6 07                 ANI    07H        ;SEE IF ANY SOFT ERRORS
3527  8E6F  C2 8F 8E              JNZ    SFRT
3528  8E72  3A DD A1              LDA    SFFLG1
3529  8E75  E6 80                 ANI    80H        ;SEE IF NEED DOLLAR VALUE
3530  8E77  C0                    RNZ
3531  8E78  CD 23 93              CALL   DOLHD
3532  8E7B  CD 34 93              CALL   ADSUBF
3533  8E7E  CD E6 93              CALL   STRFEE
3534  8E81  CD F5 93              CALL   ASFETL
3535  8E84  CD 0B 94              CALL   STFED0
3536  8E87  3A DD A1              LDA    SFFLG1
3537  8E8A  E6 08                 ANI    08H
3538  8E8C  C2 A6 8E              JNZ    SFCAL1
3539  8E8F  3E 00       SFRT:     MVI    A,00H
3540  8E91  32 DD A1              STA    SFFLG1
3541  8E94  3A 17 F8              LDA    ERRSF
3542  8E97  E6 0F                 ANI    0FH
3543  8E99  21 76 F8    TOLARG:   LXI    H,TOTC2
3544  8E9C  11 0E F8              LXI    D,E0
3545  8E9F  CD 08 00              CALL   SWAP
3546  8EA2  CD 40 00              CALL   SETDP0
3547  8EA5  C9                    RET
3548  8EA6  3A FD A1    SFCAL1:   LDA    SFTBD0
3549  8EA9  E6 FF                 ANI    0FFH
3550  8EAB  CA 8F 8E              JZ     SFRT
3551  8EAE  C3 4B 8E              JMP    SFCAL7
3552  8EB1                DOFES:
3553  8EB1  3E 00                 MVI    A,0
3554  8EB3  32 DD A1              STA    SFFLG1
3555  8EB6  CD 67 8E              CALL   DOLFEE
3556  8EB9  3A DD A1              LDA    SFFLG1
3557  8EBC  E6 80                 ANI    80H
3558  8EBE  C0                    RNZ
3559  8EBF  3A CF A1              LDA    SFDONE
3560  8EC2  CD E1 8D              CALL   REDUE2
3561  8EC5  3E 00                 MVI    A,0
3562  8EC7  32 CF A1              STA    SFDONE
3563  8ECA  3E 08                 MVI    A,8
3564  8ECC  32 DD A1              STA    SFFLG1
3565  8ECF  C3 4B 8E              JMP    SFCAL7
3566  8ED2                DISFEE:
3567  8ED2  3A CF A1              LDA    SFDONE     ;IFF NO FEES DONE RETURN
3568  8ED5  E6 FF                 ANI    0FFH
3569  8ED7  C8                    RZ
3570  8ED8  16 08                 MVI    D,8        ;DISPLAY ALL FEES
3571  8EDA  47                    MOV    B,A
3572  8EDB  AF                    XRA    A
3573  8EDC  32 48 F8              STA    DP         ;TURN OFF DP
3574  8EDF  DB F3                 IN     RM10PC
3575  8EE1  F6 04                 ORI    4          ;TURN OFF MONETARY SYMBOL
3576  8EE3  D3 F3                 OUT    RM10PC
3577  8EE5  3E 00                 MVI    A,0
3578  8EE7  37                    STC
3579  8EE8                DISFE4:
3580  8EE8  17                    RAL
3581  8EE9  4F                    MOV    C,A
3582  8EEA  A0                    ANA    B
```

```
3583  8EEB  C4 F7 8E           CNZ     DISFE5
3584  8EEE  79                 MOV     A,C
3585  8EEF  15                 DCR     D
3586  8EF0  C2 EB 8E           JNZ     DISFE4
3587  8EF3  CD 40 00           CALL    SETDP0          ;TURN ON DP AND MONEY SYMBOL
3588  8EF6  C9                 RET
3590  A146              SFTEMP EQU     0A146H
3591                           ;THIS ROUTINE DISPLAYS SF DONE
3592  8EF7              DISFE5:
3593  8EF7  C5                 PUSH    B
3594  8EF8  D5                 PUSH    D
3595  8EF9  0E 00              MVI     C,0
3596  8EFB  B7                 ORA     A
3597  8EFC              DISFE6:
3598  8EFC  1F                 RAR
3599  8EFD  0C                 INR     C
3600  8EFE  D2 FC 8E           JNC     DISFE6
3601  8F01  C5                 PUSH    B
3602  8F02  21 0E F8           LXI     H,E0
3603  8F05  11 46 A1           LXI     D,SFTEMP
3604  8F08  CD 00 00           CALL    SWAP
3605  8F0B  C1                 POP     B
3606  8F0C  79                 MOV     A,C
3607  8F0D  21 0E F8           LXI     H,E0
3608  8F10  77                 MOV     M,A
3609  8F11  2B                 DCX     H
3610  8F12  3E 1E              MVI     A,01EH
3611  8F14  77                 MOV     M,A
3612  8F15  2B                 DCX     H
3613  8F16  77                 MOV     M,A
3614  8F17  2B                 DCX     H
3615  8F18  77                 MOV     M,A
3616  8F19  3E 05              MVI     A,5
3617  8F1B  2B                 DCX     H
3618  8F1C  77                 MOV     M,A
3619  8F1D              DISFE7:
3620  8F1D  CD 03 00           CALL    UPDATE
3621  8F20  21 FF BF           LXI     H,0BFFFH
3622  8F23              DECH7:
3623  8F23  2B                 DCX     H
3624  8F24  7D                 MOV     A,L
3625  8F25  B4                 ORA     H
3626  8F26  C2 23 8F           JNZ     DECH7
3627  8F29  21 46 A1           LXI     H,SFTEMP
3628  8F2C  11 0E F8           LXI     D,E0
3629  8F2F  CD 1B 00           CALL    SWAP2
3630  8F32  D1                 POP     D
3631  8F33  C1                 POP     B
3632  8F34  C9                 RET
3634  8F35  2A 79 F8  GTRTFE:  LHLD    SFADR2          ;GET STARTING ADDR OF SF
3635  8F38  EB                 XCHG
3636  8F39  21 74 A1           LXI     H,SFNID0        ;INCC TO CORRECT ADDR FOR DOLFEE
3637  8F3C  22 F8 A1           SHLD    SFBMAD
3638  8F3F  3A FD A1           LDA     SFTBD0
3639  8F42  47                 MOV     B,A
3640  8F43  37                 STC
3641  8F44  3E 00              MVI     A,00H           ;INC TO CORRECT FEE
3642  8F46  EB                 XCHG
3643  8F47  17        GTFEE:   RAL
3644  8F48  4F                 MOV     C,A
3645  8F49  C5                 PUSH    B
3646  8F4A  A0                 ANA     B
3647  8F4B  C2 61 8F           JNZ     RTSFAD
3648  8F4E  CD 18 00           CALL    ADINDE
3649  8F51  2A F8 A1           LHLD    SFBMAD
3650  8F54  7D                 MOV     A,L
3651  8F55  C6 10              ADI     10H
3652  8F57  6F                 MOV     L,A
3653  8F58  22 F8 A1           SHLD    SFBMAD
3654  8F5B  EB                 XCHG
3655  8F5C  C1                 POP     B
3656  8F5D  79                 MOV     A,C
3657  8F5E  C3 47 8F           JMP     GTFEE
3658  8F61  7D        RTSFAD:  MOV     A,L
3659  8F62  FE FF              CPI     0FFH
3660  8F64  CA 77 8F           JZ      SFER1
3661  8F67  C1                 POP     B
3662  8F68  79                 MOV     A,C
3663  8F69  32 F0 A1           STA     SFDIN0
3664  8F6C  3A FD A1           LDA     SFTBD0
3665  8F6F  A9                 XRA     C
3666  8F70  32 FD A1           STA     SFTBD0
3667  8F73  CD 18 00           CALL    ADINDE
3668  8F76  C9                 RET
3669  8F77  3E 04     SFER1:   MVI     A,04H
3670  8F79  C1                 POP     B
3671  8F7A  32 DD A1           STA     SFFLG1
3672  8F7D  C9                 RET
3673  8F7E  3E 02     SFRT11:  MVI     A,02H
3674  8F80  C1                 POP     B
3675  8F81  32 DD A1           STA     SFFLG1
3676  8F84  C9                 RET
3678  8F85  3A 3B F8  FEOKRT:  LDA     RS21            ;SEE IF SF IS COMPATIBLE WITH RATE CHART
3679  8F88  47                 MOV     B,A
3680  8F89  3A F0 A1           LDA     SFDIN0
3681  8F8C  A0                 ANA     B
3682  8F8D  CA D5 8F           JZ      SFER2
3683  8F90  3E 00              MVI     A,00H
3684  8F92  32 FC A1           STA     ADSUB
3685  8F95  CD 10 00           CALL    RDPROM
```

```
3686  8F98  47               MOV    B,A
3687  8F99  E6 80            ANI    80H
3688  8F9B  C2 A3 8F         JNZ    OKRT1
3689  8F9E  3E 80            MVI    A,80H
3690  8FA0  32 FC A1         STA    ADSUB
3691  8FA3  78        OKRT1: MOV    A,B
3692  8FA4  E6 7F            ANI    7FH
3693  8FA6  32 E5 A1         STA    MH0
3694  8FA9  CD 10 00  KSR1:  CALL   RDPROM
3695  8FAC  47               MOV    B,A
3696  8FAD  3A 3A F8         LDA    RS11
3697  8FB0  A0               ANA    B
3698  8FB1  CA BE 8F         JZ     SFER21
3699  8FB4  C9               RET
3700  8FB5  3A DD A1  SFER2: LDA    SFFLG1
3701  8FB8  F6 02            ORI    02H
3702  8FBA  32 DD A1         STA    SFFLG1
3703  8FBD  C9               RET
3704  8FBE  3A E5 A1  SFER21:LDA    MH0
3705  8FC1  3D               DCR    A
3706  8FC2  32 E5 A1         STA    MH0
3707  8FC5  E6 03            ANI    03H
3708  8FC7  CA B5 8F         JZ     SFER2
3709  8FCA  3A E5 A1         LDA    MH0
3710  8FCD  E6 70            ANI    70H
3711  8FCF  C2 DB 8F         JNZ    FR
3712  8FD2  CD 10 00         CALL   RDPROM
3713  8FD5  CD 10 00         CALL   RDPROM
3714  8FD8  C3 A9 8F         JMP    KSR1
3715  8FDB  3A E5 A1  FR:    LDA    MH0
3716  8FDE  E6 40            ANI    40H              ;SEE IF SKIP WR
3717  8FE0  CA E6 8F         JZ     W
3718  8FE3  CD 10 00         CALL   RDPROM           ;SKIP KEY RESTRICTION
3719  8FE6  3A E5 A1  W:     LDA    MH0
3720  8FE9  E6 20            ANI    20H              ;SEE IF WR
3721  8FEB  CA FC 8F         JZ     I
3722  8FEE  CD 10 00         CALL   RDPROM
3723  8FF1  E6 01            ANI    01H              ;1 OR 2 BYTES SKIP
3724  8FF3  C2 F9 8F         JNZ    W1
3725  8FF6  CD 10 00         CALL   RDPROM
3726  8FF9  CD 10 00  W1:    CALL   RDPROM
3727  8FFC  3A E5 A1  I:     LDA    MH0
3728  8FFF  E6 10            ANI    10H              ;SEE IF I
3729  9001  CA 18 90         JZ     I12
3730  9004  CD 10 00         CALL   RDPROM           ;SEE IF 1 OR 2 BYTE SKIP
3731  9007  E6 01            ANI    01H
3732  9009  C2 0F 90         JNZ    I11
3733  900C  CD 10 00         CALL   RDPROM
3734  900F  CD 10 00  I11:   CALL   RDPROM
3735  9012  CD 10 00         CALL   RDPROM
3736  9015  CD 10 00         CALL   RDPROM
3737  9018  CD 10 00  I12:   CALL   RDPROM
3738  901B  CD 10 00         CALL   RDPROM
3739  901E  C3 A9 8F         JMP    KSR1
3741  9021  3A E5 A1  CTREST:LDA    MH0
3742  9024  E6 70            ANI    70H
3743  9026  C8               RZ
3744  9027  E6 40            ANI    40H
3745  9029  CA 42 90         JZ     PRE1             ;SEE IF VT REST
3746                         ;SF RESTRICTION
3747  902C  CD 10 00         CALL   RDPROM
3748  902F  32 AE A1         STA    SFRH0
3749  9032  47               MOV    B,A
3750  9033  3A CF A1         LDA    SFDONE
3751  9036  A0               ANA    B
3752  9037  C2 49 90         JNZ    PRE              ;INS REST SEE IF PRE REQ FEES DONE
3753  903A  3A DD A1         LDA    SFFLG1
3754  903D  F6 04            ORI    04H              ;SET SOFT ERROR FLG
3755  903F  32 DD A1         STA    SFFLG1
3756  9042  CD 54 90  PRE1:  CALL   WR
3757  9045  CD BD 90         CALL   IR
3758  9048  C9               RET
3759  9049  3A DD A1  PRE:   LDA    SFFLG1
3760  904C  F6 20            ORI    20H              ;SETR PR REC FLAG
3761  904E  32 DD A1         STA    SFFLG1
3762  9051  C3 42 90         JMP    PRE1
3764  9054  3A E5 A1  WR:    LDA    MH0
3765  9057  E6 20            ANI    20H
3766  9059  C8               RZ
3767  905A  CD 10 00  WR1:   CALL   RDPROM           ;GET VT HDR
3768  905D  32 FA A1         STA    WRH0
3769  9060  E5               PUSH   H
3770  9061  21 55 F8         LXI    H,STW1Z
3771  9064  E6 10            ANI    10H
3772  9066  C2 87 90         JNZ    RDOZ
3773  9069  3A FA A1         LDA    WRH0
3774  906C  E6 01            ANI    01H
3775  906E  CA 87 90         JZ     RDOZ
3776  9071  3E 00            MVI    A,00H
3777  9073  77               MOV    M,A
3778  9074  2B               DCX    H
3779  9075  77               MOV    M,A
3780  9076  2B               DCX    H
3781  9077  EB        RDLB:  XCHG
3782  9078  E1               POP    H
3783  9079  CD 10 00  RDLB2: CALL   RDPROM
3784  907C  CD 20 00         CALL   UNPCK
3785  907F  EB               XCHG
3786  9080  77        RDLB1: MOV    M,A
3787  9081  79               MOV    A,C
```

```
3788  9082  2B                       DCX    H
3789  9083  77                       MOV    M,A
3790  9084  C3 A1 90                 JMP    TST
3791  9087  EB            RDOZ:      XCHG
3792  9088  E1                       POP    H
3793  9089  CD 10 00                 CALL   RDPROM
3794  908C  CD 20 00                 CALL   UNPCK
3795  908F  77                       MOV    M,A
3796  9090  2B                       DCX    H
3797  9091  79                       MOV    A,C
3798  9092  77                       MOV    M,A
3799  9093  3A FA A1                 LDA    WRH0         ;SEE IF POUNDS
3800  9096  E6 10                    ANI    10H
3801  9098  C2 79 90                 JNZ    RDLB2
3802  909B  3E 00                    MVI    A,00H
3803  909D  2B                       DCX    H
3804  909E  C3 80 90                 JMP    RDLB1
3805  90A1  E5            TST:       PUSH   H
3806  90A2  21 35 F8                 LXI    H,STW1Z
3807  90A5  11 14 F8                 LXI    D,SW10Z
3808  90A8  0E 04                    MVI    C,04
3809  90AA  CD 05 8E                 CALL   CMP1
3810  90AD  CA BB 90                 JZ     TSTRT
3811  90B0  F2 BB 90                 JP     TSTRT
3812  90B3  3A DD A1                 LDA    SFFLG1
3813  90B6  F6 02                    ORI    02H
3814  90B8  32 DD A1                 STA    SFFLG1
3815  90BB  E1            TSTRT:     POP    H
3816  90BC  C9                       RET
3818  90BD  3A E5 A1      IR:        LDA    MR0
3819  90C0  E6 10                    ANI    10H
3820  90C2  C8                       RZ
3821  90C3  CD 10 00                 CALL   RDPROM
3822  90C6  32 FB A1                 STA    IRH0
3823  90C9  3A DD A1                 LDA    SFFLG1
3824  90CC  E6 20                    ANI    20H          ;SEE IF PRE FEES DONE
3825  90CE  C2 E7 90                 JNZ    IR1
3826  90D1  CD 10 00                 CALL   RDPROM
3827  90D4  47                       MOV    B,A
3828  90D5  3A CF A1                 LDA    SFDONE       ;SEE IF RETRICTION FEE IS DONE
3829  90D8  A0                       ANA    B
3830  90D9  CA EA 90                 JZ     IR11
3831  90DC  3A DD A1                 LDA    SFFLG1
3832  90DF  E6 FB                    ANI    0FBH
3833  90E1  32 DD A1                 STA    SFFLG1
3834  90E4  C3 FF 90                 JMP    IK0
3835  90E7  CD 10 00      IR1:       CALL   RDPROM
3836  90EA  CD 10 00      IR11:      CALL   RDPROM
3837  90ED  3A FB A1                 LDA    IRH0
3838  90F0  E6 03                    ANI    03H
3839  90F2  3D            IR2:       DCR    A
3840  90F3  FA FE 90                 JM     IR12
3841  90F6  F5                       PUSH   PSW
3842  90F7  CD 10 00                 CALL   RDPROM
3843  90FA  F1                       POP    PSW
3844  90FB  C3 F2 90                 JMP    IR2
3845  90FE  C9            IR12:      RET
3847  90FF  CD 10 00      IK0:       CALL   RDPROM       ;CHECK OUT RESTRICTION
3848  9102  E5                       PUSH   H
3849  9103  21 74 A1                 LXI    H,SFN1D0
3850  9106  3D                       DCR    A
3851  9107  E6 F0                    ANI    0F0H
3852  9109  6F                       MOV    L,A
3853  910A  EB                       XCHG
3854  910B  E1                       POP    H
3855  910C  CD 10 00                 CALL   RDPROM       ;READ RESTRICTION DATA
3856  910F  CD 20 00                 CALL   UNPCK
3857  9112  E5                       PUSH   H
3858  9113  21 4C A1                 LXI    H,SFC2
3859  9116  77                       MOV    M,A
3860  9117  2B                       DCX    H
3861  9118  79                       MOV    A,C
3862  9119  77                       MOV    M,A
3863  911A  3A FB A1                 LDA    IRH0
3864  911D  E6 01                    ANI    01H
3865  911F  C2 38 91                 JNZ    STRD0
3866  9122  E1                       POP    H
3867  9123  CD 10 00                 CALL   RDPROM
3868  9126  CD 20 00                 CALL   UNPCK
3869  9129  E5                       PUSH   H
3870  912A  21 4A A1      STD:       LXI    H,SFD1
3871  912D  77                       MOV    M,A
3872  912E  2B                       DCX    H
3873  912F  79                       MOV    A,C
3874  9130  77                       MOV    M,A
3875  9131  3E 00                    MVI    A,00H
3876  9133  2B                       DCX    H
3877  9134  77                       MOV    M,A
3878  9135  C3 3F 91                 JMP    INSTST
3879  9138  3E 00         STRD0:     MVI    A,00H
3880  913A  0E 00                    MVI    C,00H
3881  913C  C3 2A 91                 JMP    STD
3883  913F  21 48 A1      INSTST:    LXI    H,SFDS       ;SEE IF INSURANCE RESTRICTION IS MEET
3884  9142  CD 03 8E                 CALL   CMP
3885  9145  FA 4D 91                 JM     IRERR
3886  9148  CA 4D 91                 JZ     IRERR
3887  914B  E1                       POP    H
3888  914C  C9                       RET
3889  914D  3A DD A1      IRERR:     LDA    SFFLG1       ;RESTRICTION ERROR
3890  9150  F6 02                    ORI    02H
```

| | | | | | | |
|---|---|---|---|---|---|---|
| 3891 | 9152 | 32 DD A1 | | STA | SFFLG1 | |
| 3892 | 9155 | E1 | | POP | H | |
| 3893 | 9156 | C9 | | RET | | |
| 3895 | 9157 | CD 18 00 | CTSFM: | CALL | ADINDE | |
| 3896 | 915A | EB | | XCHG | | |
| 3897 | 915B | CD 10 00 | | CALL | RDPROM | |
| 3898 | 915E | 32 AF A1 | | STA | SFM0 | |
| 3899 | 9161 | C9 | | RET | | |
| 3901 | 9162 | CD 10 00 | GTCHD: | CALL | RDPROM | ;GET CHART HEADER |
| 3902 | 9165 | 32 E6 A1 | | STA | CH0 | |
| 3903 | 9168 | C3 EF 91 | | JMP | CKFEDN | |
| 3904 | 916B | 3A E6 A1 | GTCHD1: | LDA | CH0 | ;SEE IF WEIGHT OR DOLLAR VALUE FEE |
| 3905 | 916E | E6 80 | | ANI | 80H | |
| 3906 | 9170 | CA BF 92 | | JZ | DOLKY | |
| 3907 | 9173 | 3E 00 | WTOR2: | MVI | A,00H | ;WEIGHT FEE |
| 3908 | 9175 | 32 6A F8 | | STA | WTOFF1 | ;ZERO COUNTER FOR CALCULATIONS |
| 3909 | 9178 | 3A E5 A1 | | LDA | MH0 | |
| 3910 | 917B | E6 F0 | | ANI | 0F0H | |
| 3911 | 917D | 47 | | MOV | B,A | |
| 3912 | 917E | 3A E6 A1 | | LDA | CH0 | |
| 3913 | 9181 | E6 0F | | ANI | 0FH | |
| 3914 | 9183 | B0 | | ORA | B | |
| 3915 | 9184 | E6 F7 | | ANI | 0F7H | |
| 3916 | 9186 | 32 E5 A1 | | STA | MH0 | |
| 3917 | 9189 | 3A 6A F8 | SR21: | LDA | WTOFF1 | ;INC COUNTER FOR NEXT VALUE |
| 3918 | 918C | C6 01 | | ADI | 01H | |
| 3919 | 918E | 32 6A F8 | | STA | WTOFF1 | |
| 3920 | 9191 | 3A E6 A1 | | LDA | CH0 | |
| 3921 | 9194 | E6 80 | | ANI | 80H | |
| 3922 | 9196 | C2 0D 92 | | JNZ | WT | |
| 3923 | 9199 | CD 10 00 | | CALL | RDPROM | |
| 3924 | 919C | EB | | XCHG | | |
| 3925 | 919D | 21 4C A1 | | LXI | H,SFC2 | |
| 3926 | 91A0 | CD 20 00 | | CALL | UNPCK | ;STORE NEXT VALUE |
| 3927 | 91A3 | 77 | | MOV | M,A | |
| 3928 | 91A4 | 79 | | MOV | A,C | |
| 3929 | 91A5 | 2B | | DCX | H | |
| 3930 | 91A6 | 77 | | MOV | M,A | |
| 3931 | 91A7 | 2B | | DCX | H | |
| 3932 | 91A8 | 3A E6 A1 | | LDA | CH0 | |
| 3933 | 91AB | E6 10 | | ANI | 10H | |
| 3934 | 91AD | CA C3 91 | | JZ | ZDOL | |
| 3935 | 91B0 | EB | | XCHG | | |
| 3936 | 91B1 | CD 10 00 | | CALL | RDPROM | |
| 3937 | 91B4 | CD 20 00 | | CALL | UNPCK | |
| 3938 | 91B7 | EB | | XCHG | | |
| 3939 | 91B8 | 77 | DOL1: | MOV | M,A | |
| 3940 | 91B9 | 79 | | MOV | A,C | |
| 3941 | 91BA | 2B | | DCX | H | |
| 3942 | 91BB | 77 | | MOV | M,A | |
| 3943 | 91BC | 3E 00 | | MVI | A,00H | |
| 3944 | 91BE | 2B | | DCX | H | |
| 3945 | 91BF | 77 | | MOV | M,A | |
| 3946 | 91C0 | C3 CA 91 | | JMP | SUB0 | |
| 3947 | 91C3 | 3E 00 | ZDOL: | MVI | A,00H | |
| 3948 | 91C5 | 0E 00 | | MVI | C,00H | |
| 3949 | 91C7 | C3 B8 91 | | JMP | DOL1 | |
| 3950 | 91CA | EB | SUB0: | XCHG | | ;SEE IF WITHIN DOLLAR RANGE |
| 3951 | 91CB | E5 | | PUSH | H | |
| 3952 | 91CC | 2A F8 A1 | | LHLD | SFBMAD | |
| 3953 | 91CF | 2B | | DCX | H | |
| 3954 | 91D0 | 2B | | DCX | H | |
| 3955 | 91D1 | 2B | | DCX | H | ;POINT H AT MOST SIG DIGIT |
| 3956 | 91D2 | 2B | | DCX | H | |
| 3957 | 91D3 | 11 48 A1 | | LXI | D,SFD3 | |
| 3958 | 91D6 | CD 03 8E | SUB10: | CALL | CMP | ;SEE IF COMPARE IS GOOD |
| 3959 | 91D9 | CA 65 92 | | JZ | OK | |
| 3960 | 91DC | F2 65 92 | | JP | OK | |
| 3961 | 91DF | 3A E5 A1 | | LDA | MH0 | |
| 3962 | 91E2 | 3D | | DCR | A | |
| 3963 | 91E3 | E6 07 | | ANI | 07H | |
| 3964 | 91E5 | CA 75 92 | | JZ | NXTHDR | ;IF COMPARE FAILS GO TO NEXT HEADER |
| 3965 | 91E8 | 32 E5 A1 | | STA | MH0 | |
| 3966 | 91EB | E1 | | POP | H | |
| 3967 | 91EC | C3 89 91 | | JMP | SR21 | ;IF NOT OUT OF VALUES IN THIS HEADER GO TO NEXT VALUE |
| 3969 | 91EF | 3A F0 A1 | CKFEDN: | LDA | SFDIN0 | ;SEE IF FEE IS DONE |
| 3970 | 91F2 | 47 | | MOV | B,A | |
| 3971 | 91F3 | 3A CF A1 | | LDA | SFDONE | |
| 3972 | 91F6 | A0 | | ANA | B | |
| 3973 | 91F7 | CA 6B 91 | | JZ | GTCHD1 | |
| 3974 | 91FA | 3A E6 A1 | | LDA | CH0 | |
| 3975 | 91FD | E6 80 | | ANI | 80H | |
| 3976 | 91FF | C2 5C 92 | | JNZ | CHER1 | |
| 3977 | 9202 | 3A DD A1 | | LDA | SFFLG1 | |
| 3978 | 9205 | F6 48 | | ORI | 48H | |
| 3979 | 9207 | 32 DD A1 | | STA | SFFLG1 | |
| 3980 | 920A | C3 6B 91 | | JMP | GTCHD1 | |
| 3982 | 920D | 11 55 F8 | WT: | LXI | D,STW1Z | ;STORE WEIGHT INFORMATION |
| 3983 | 9210 | 0E 04 | | MVI | C,04H | |
| 3984 | 9212 | 3E 00 | ZERLB: | MVI | A,00H | |
| 3985 | 9214 | 12 | | STAX | D | |
| 3986 | 9215 | 1B | | DCX | D | |
| 3987 | 9216 | 0D | | DCR | C | |
| 3988 | 9217 | C2 12 92 | | JNZ | ZERLB | |
| 3989 | 921A | 3A E6 A1 | | LDA | CH0 | |
| 3990 | 921D | E6 10 | | ANI | 10H | |
| 3991 | 921F | C2 30 92 | | JNZ | OZ6 | |
| 3992 | 9222 | 3A E6 A1 | | LDA | CH0 | |
| 3993 | 9225 | E6 40 | | ANI | 40H | |
| 3994 | 9227 | CA 30 92 | | JZ | OZ6 | |

```
3995  922A  11 53 F8        STRLB6: LXI   D,STP1LB
3996  922D  C3 33 92                JMP   STRW
3997  9230  11 55 F8        OZ6:    LXI   D,STW1Z
3998  9233  CD 10 00        STRW:   CALL  RDPROM
3999  9236  CD 20 00                CALL  UNPCK
4000  9239  12                      STAX  D
4001  923A  1B                      DCX   D
4002  923B  79                      MOV   A,C
4003  923C  12                      STAX  D
4004  923D  3A E6 A1                LDA   CH0
4005  9240  E6 10                   ANI   10H           ;SEE IF LBS
4006  9242  C2 4F 92                JNZ   LB1
4007  9245  E5                      PUSH  H
4008  9246  21 12 F8                LXI   H,SW10LB
4009  9249  11 52 F8                LXI   D,STW10B
4010  924C  C3 D6 91                JMP   SUB10
4011  924F  3A E6 A1        LB1:    LDA   CH0
4012  9252  47                      MOV   B,A
4013  9253  3E 10                   MVI   A,10H
4014  9255  A8                      XRA   B
4015  9256  32 E6 A1                STA   CH0
4016  9259  C3 2A 92                JMP   STRLB6
4017  925C  3A DD A1        CHER1:  LDA   SFFLG1
4018  925F  F6 01                   ORI   01H
4019  9261  32 DD A1                STA   SFFLG1
4020  9264  C9                      RET
4021  9265  E1              OK:     POP   H
4022  9266  3A AF A1                LDA   SFM0          ;SEE IF FEE IS GOOD
4023  9269  2F                      CMA
4024  926A  47                      MOV   B,A
4025  926B  3A CF A1                LDA   SFDONE
4026  926E  A0                      ANA   B
4027  926F  C8                      RZ
4028  9270  CD 36 94                CALL  REDU12
4029  9273  C9                      RET
4030  9274  C9                      RET
4031  9275  E1              NXTHDR: POP   H
4032  9276  CD 10 00                CALL  RDPROM
4033  9279  37                      STC
4034  927A  3F                      CMC
4035  927B  C6 20                   ADI   20H
4036  927D  DA 5C 92                JC    CHER1
4037  9280  37                      STC
4038  9281  3F                      CMC
4039  9282  B7                      ORA   A
4040  9283  DE 20                   SBI   20H
4041  9285  32 FB A1                STA   SCH0
4042  9288  E6 08                   ANI   08H
4043  928A  CA 9D 92                JZ    TVALN
4044  928D  3A FB A1                LDA   SCH0
4045  9290  E6 F7                   ANI   0F7H
4046  9292  32 FB A1                STA   SCH0
4047  9295  3A E6 A1                LDA   CH0
4048  9298  C6 10                   ADI   10H
4049  929A  32 E6 A1                STA   CH0
4050  929D  3A E5 A1        TVALN:  LDA   MH0
4051  92A0  E6 F0                   ANI   0F0H
4052  92A2  47                      MOV   B,A
4053  92A3  3A FB A1                LDA   SCH0
4054  92A6  E6 0F                   ANI   0FH
4055  92A8  B0                      ORA   B
4056  92A9  32 E5 A1                STA   MH0
4057  92AC  3A E5 A1                LDA   MH0
4058  92AF  E6 10                   ANI   10H
4059  92B1  C2 BC 92                JNZ   CLL1
4060  92B4  3A E6 A1                LDA   CH0
4061  92B7  E6 BF                   ANI   0BFH
4062  92B9  32 E6 A1                STA   CH0
4063  92BC  C3 89 91        CLL1:   JMP   SR21
4065  92BF  3A DD A1        DOLKY:  LDA   SFFLG1
4066  92C2  E6 40                   ANI   40H
4067  92C4  C2 F6 92                JNZ   CKREDU
4068  92C7  3A 0F F8        CKDLVL: LDA   ECTR          ;SEE IF DOLLAR VALUE IS ENTERED
4069  92CA  E6 0F                   ANI   0FH
4070  92CC  CA FE 92                JZ    PRT
4071  92CF  3A DD A1                LDA   SFFLG1        ;SEE IF REDOING FEES
4072  92D2  E6 40                   ANI   40H
4073  92D4  C4 3C 94                CNZ   REDU13        ;IF REDOING FEES PICK UP DOLLAR VALUE PREVIOUSLY ENTERED
4074  92D7  3A DD A1                LDA   SFFLG1
4075  92DA  E6 3F                   ANI   3FH
4076  92DC  32 DD A1                STA   SFFLG1
4077  92DF  E5                      PUSH  H
4078  92E0  2A F8 A1                LHLD  SFBMAD
4079  92E3  11 0E F8                LXI   D,E0          ;STORE DOLLAR VALUE IN CORRECT LOCATION
4080  92E6  EB                      XCHG
4081  92E7  CD 08 00                CALL  SWAP
4082  92EA  3A DD A1                LDA   SFFLG1
4083  92ED  E6 BF                   ANI   0BFH
4084  92EF  32 DD A1                STA   SFFLG1
4085  92F2  E1                      POP   H
4086  92F3  C3 73 91                JMP   WTOR2
4087  92F6  E6 40           CKREDU: ANI   40H           ;SEE IF REDOING FEES
4088  92F8  CA 73 91                JZ    WTOR2
4089  92FB  C3 C7 92                JMP   CKDLVL
4090  92FE  3E 0E           PRT:    MVI   A,0EH         ;PUT $____ IN DISPLAY AND RETURN
4091  9300  21 0E F8                LXI   H,E0
4092  9303  0E 05                   MVI   C,05H
4093  9305  77              P:      MOV   M,A
4094  9306  2B                      DCX   H
4095  9307  0D                      DCR   C
```

```
4096  9308  C2 85 93              JNZ     P
4097  930B  3E 0A                 MVI     A,0AH
4098  930D  32 09 F8              STA     DOL6
4099  9310  3E 00                 MVI     A,00
4100  9312  32 48 F8              STA     DP
4101  9315  3E 01                 MVI     A,01H
4102  9317  32 17 F8              STA     ERRSP
4103  931A  3A DD A1              LDA     SFFLG1      ;SET NEED DOLLAR VALUE
4104  931D  F6 80                 ORI     80H
4105  931F  32 DD A1              STA     SFFLG1
4106  9322  C9                    RET
4108  9323  CD 10 00   DOLHD:     CALL    RDPROM      ;INCRIMENT TO DOLLAR HEADER
4109  9326  C6 20                 ADI     .20H
4110  9328  D2 23 93              JNC     DOLHD
4111  932B  37                    STC
4112  932C  3F                    CMC
4113  932D  B7                    ORA     A
4114  932E  DE 20                 SBI     20H         ;STORE DOLLAR HEADER
4115  9330  32 F1 A1              STA     DH0
4116  9333  C9                    RET
4118  9334  3A 6A F8   ADSUBF:    LDA     WTOFF1      ;POINT AT FEE
4119  9337  3D                    DCR     A
4120  9338  CA 5E 93              JZ      FEE
4121  933B  32 6A F8              STA     WTOFF1
4122  933E  CD 10 00              CALL    RDPROM
4123  9341  3A F1 A1              LDA     DH0
4124  9344  E6 10                 ANI     10H
4125  9346  CA 4C 93              JZ      DMH
4126  9349  CD 10 00              CALL    RDPROM
4127  934C  3A F1 A1   DMH:       LDA     DH0
4128  934F  3D                    DCR     A
4129  9350  32 F1 A1              STA     DH0
4130  9353  E6 07                 ANI     07H
4131  9355  C2 34 93              JNZ     ADSUBF
4132  9358  CD 23 93              CALL    DOLHD
4133  935B  C3 34 93              JMP     ADSUBF
4134  935E  CD 10 00   FEE:       CALL    RDPROM      ;LOAD FEE
4135  9361  11 4C A1              LXI     D,SFC2
4136  9364  CD 20 00              CALL    UNPCK
4137  9367  12                    STAX    D
4138  9368  79                    MOV     A,C
4139  9369  1B                    DCX     D
4140  936A  12                    STAX    D
4141  936B  3A F1 A1              LDA     DH0
4142  936E  E6 10                 ANI     10H
4143  9370  CA 8A 93              JZ      NODOL6
4144  9373  CD 10 00              CALL    RDPROM
4145  9376  CD 20 00              CALL    UNPCK
4146  9379  1B         ND1:       DCX     D
4147  937A  12                    STAX    D
4148  937B  1B                    DCX     D
4149  937C  79                    MOV     A,C
4150  937D  12                    STAX    D
4151  937E  3A E5 A1   SUM1:      LDA     MH0
4152  9381  E6 80                 ANI     80H
4153  9383  C2 91 93              JNZ     EXFE        ;EXCHANG FEE WITH DOLLAR VALUE
4154  9386  CD 9B 93              CALL    ADSUB1      ;ADD OR SUBTRACT FEE FROM DOLLAR TOTAL
4155  9389  C9                    RET
4156  938A  3E 00      NODOL6:    MVI     A,00H
4157  938C  0E 00                 MVI     C,00H
4158  938E  C3 79 93              JMP     ND1
4160  9391  21 4C A1   EXFE:      LXI     H,SFC2
4161  9394  11 76 F8              LXI     D,TOTC2
4162  9397  CD 08 00              CALL    SWAP
4163  939A  C9                    RET
4165  939B  3A FC A1   ADSUB1:    LDA     ADSUB
4166  939E  E6 FF                 ANI     0FFH
4167  93A0  C2 C8 93              JNZ     SUBFEE      ;SEE IF ADD OR SUBTRACT FEE
4168  93A3  21 76 F8              LXI     H,TOTC2     ;ADD FEE TO DOLLAR TOTAL
4169  93A6  11 4C A1              LXI     D,SFC2
4170  93A9  0E 05      ADFETL:    MVI     C,05H
4171  93AB  37                    STC
4172  93AC  3F                    CMC
4173  93AD  1A         ADDFEE:    LDAX    D
4174  93AE  8E                    ADC     M
4175  93AF  37                    STC
4176  93B0  3F                    CMC
4177  93B1  27                    DAA
4178  93B2  47                    MOV     B,A
4179  93B3  E6 10                 ANI     10H
4180  93B5  CA BF 93              JZ      ADDFE1
4181  93B8  78                    MOV     A,B
4182  93B9  E6 0F                 ANI     0FH
4183  93BB  37                    STC
4184  93BC  C3 C0 93              JMP     ADDFE2
4185  93BF  78         ADDFE1:    MOV     A,B
4186  93C0  77         ADDFE2:    MOV     M,A
4187  93C1  1B                    DCX     D
4188  93C2  2B                    DCX     H
4189  93C3  0D                    DCR     C
4190  93C4  C2 AD 93              JNZ     ADDFEE
4191  93C7  C9                    RET
4193  93C8  11 76 F8   SUBFEE:    LXI     D,TOTC2
4194  93CB  0E 05      SUBFET:    MVI     C,05H
4195  93CD  37                    STC
4196  93CE  3F                    CMC
4197  93CF  1A         SUBFE1:    LDAX    D
4198  93D0  9E         SUBFE2:    SBB     M
4199  93D1  FA DB 93              JM      SUBFE3
4200  93D4  77                    MOV     M,A
```

```
4201  93D5  1B             DCX    D
4202  93D6  2B             DCX    H
4203  93D7  0D             DCR    C
4204  93D8  C2 CF 93       JNZ    SUBFE1
4205  93DB  1B      SUBFE3: DCX   D
4206  93DC  1A             LDAX   D
4207  93DD  3D             DCR    A
4208  93DE  12             STAX   D
4209  93DF  13             INX    D
4210  93E0  1A             LDAX   D
4211  93E1  C6 0A          ADI    0AH
4212  93E3  C3 D0 93       JMP    SUBFE2
4214  93E6  2A F8 A1 STRFEE: LHLD SFBMAD
4215  93E9  7D             MOV    A,L
4216  93EA  C6 08          ADI    08H
4217  93EC  6F             MOV    L,A
4218  93ED  11 4C A1       LXI    D,SFC2
4219  93F0  EB             XCHG
4220  93F1  CD 08 00       CALL   SWAP
4221  93F4  C9             RET
4223  93F5  21 6C A1 ASFETL: LXI  H,SFTLC2
4224  93F8  11 4C A1       LXI    D,SFC2
4225  93FB  3A FC A1       LDA    ADSUB
4226  93FE  E6 FF          ANI    0FFH
4227  9400  C2 07 94       JNZ    SUB11
4228  9403  CD A9 93       CALL   ADFETL
4229  9406  C9             RET
4230  9407  CD CB 93 SUB11: CALL  SUBFET
4231  940A  C9             RET
4232  940B  3A CF A1 STFEDO: LDA   SFDONE
4233  940E  47             MOV    B,A
4234  940F  3A F0 A1       LDA    SFDINO
4235  9412  B0             ORA    B
4236  9413  32 CF A1       STA    SFDONE
4237  9416  3E 00          MVI    A,00H
4238  9418  32 F0 A1       STA    SFDINO
4239  941B  11 0E F8       LXI    D,E0
4240  941E  21 76 F8       LXI    H,TOTC2
4241  9421  CD 08 00       CALL   SWAP
4242  9424  3E 0A          MVI    A,0AH
4243  9426  32 09 F8       STA    DOLS
4244  9429  3E 08          MVI    A,08H
4245  942B  32 48 F8       STA    DP
4246  942E  3E 00          MVI    A,00
4247  9430  32 0F F8       STA    ECTR
4248  9433  C9             RET
4249  9434  C9             RET
4250  9435  C9             RET
4251  9436  CD 42 94 REDU12: CALL REDU11
4252  9439  C3 C9 8D       JMP    REDUE
4253  943C  CD 42 94 REDU13: CALL REDU11
4254  943F  C3 F0 8D       JMP    REDUE1
4255  9442  E5      REDU11: PUSH  H
4256  9443  21 6C A1       LXI    H,SFTLC2
4257  9446  0E 05          MVI    C,05H
4258  9448  77      REDUS:  MOV   M,A
4259  9449  2B             DCX    H
4260  944A  0D             DCR    C
4261  944B  C2 48 94       JNZ    REDUS
4262  944E  E1             POP    H
4263  944F  C9             RET
```

Having thus described the invention, there is claimed as new and desired to be secured by Letters Patent:

1. A postage value calculating system for calculating and displaying a postage value required for operating an article, the system comprising keyboard means for operator entry of postage value related information, display means for keyboard entries, means for providing article weight information, the display means including means for displaying the article weight information, the keyboard means including means for selecting special postal services from a plurality of special postal services available for use in conjunction with transporting the article, means for calculating a postage value for the article from the postage value related information, the weight information and the special services information, the display means further including means for displaying the computed postage value for the article, and means for recalling all of the special services upon which the calculated postage value has been based and displaying such special services on the display means, including means for displaying both indicia indicative of each of such selected special services and indicia indicating the portion of the computed postage value attributed to each selected special service.

2. A postage value calculating system constructed in accordance with claim 1 wherein the calculating means includes a random access memory, the calculating means determining a fee value for each selected special service and storing each determined fee value in the random access memory, the means for recalling and indicating the special services including means for recalling each stored determined fee value.

3. A postage value calculating system constructed in accordance with claim 1 wherein the means for recalling and displaying the selected special service indicia includes means for removing and storing information indicated in the display means prior to displaying the selected special services and for replacing the stored indicia in the display means after sequentially displaying the selected special services.

4. A postage value calculating system constructed in accordance with claim 1 wherein the means for recalling and displaying all of the special services includes means for sequentially indicating each special service upon which the calculated postage value has been based.

5. A method of reducing operator errors in a postage calculating system, the calculating system comprising a processor, weigh means for providing article weight information, display means for displaying postal information including calculated postage values, memory means for storing postal rate information and keyboard means for operator entry of postage value related information, the postage value related information including special services, the method comprising the steps of:
    (a) recalling each special service upon which a calculated postage value has been based,
    (b) displaying each recalled special service on the display each recalled special service on the display means; and
    recalling a fee value for each selected service and indicating such fee value in the display.

6. A method of reducing operator errors in a postage calculating system as set forth in claim 5 further including the steps of storing the postal information appearing in the display and clearing the display of such postal information prior to the step of indicating each recalled special service.

7. A method of reducing operator errors in a postage calculating system as set forth in claim 6 further including the step of
    (c) restoring the stored postal information to the display after indicating each recalled special service.

8. A method of reducing operator errors in a postage calculating system as set forth in claim 5 wherein the recalled special services are sequentially displayed in the display.

* * * * *